United States Patent [19]

Dutta et al.

[11] Patent Number: 5,302,318
[45] Date of Patent: *Apr. 12, 1994

[54] METHOD FOR INCREASING THE COHESIVENESS OF POWDERS IN FLUID BEDS

[75] Inventors: Arunava Dutta, Chestnut Hill; Leonard V. Dullea, Peabody, both of Mass.

[73] Assignee: GTE Products Corporation, Danvers, Mass.

[*] Notice: The portion of the term of this patent subsequent to Dec. 10, 2008 has been disclaimed.

[21] Appl. No.: 737,958

[22] Filed: Jul. 30, 1991

Related U.S. Application Data

[63] Continuation of Ser. No. 612,942, Nov. 13, 1990, Pat. No. 5,071,590.

[51] Int. Cl.⁵ .............................................. B05C 11/02
[52] U.S. Cl. ............................. 252/301.4 R; 427/213; 23/313 FB; 34/10; 366/102; 423/DIG. 16
[58] Field of Search .................... 366/102; 34/10; 427/213; 252/301.4 R; 23/313 FB; 423/DIG. 16

[56] References Cited

U.S. PATENT DOCUMENTS

| | | | |
|---|---|---|---|
| 4,583,299 | 4/1986 | Brooks | 34/10 |
| 4,710,674 | 12/1987 | Sigai | 427/67 |
| 4,915,976 | 4/1990 | Brown | 427/213 |
| 4,979,830 | 12/1990 | Munn | 366/102 |

*Primary Examiner*—Prince Willis, Jr.
*Assistant Examiner*—T. Steinberg
*Attorney, Agent, or Firm*—Robert E. Walter

[57] ABSTRACT

This invention concerns the addition of fibrous alumina material to a phosphor or phosphor mixture before fluidization as a means of increasing the cohesiveness of the phosphor or phosphor mixture. The increase in cohesiveness can be controlled by varying the concentration of the fiber in the mixture.

6 Claims, 8 Drawing Sheets

METHOD FOR INCREASING THE COHESIVENESS OF POWDERS IN FLUID BEDS

This is a continuation of copending application(s) Ser. No. 07/612,942 filed on Nov. 13, 1990, now U.S. Pat. No. 5,071,590.

TECHNICAL FIELD OF THE INVENTION

This invention relates to fluid beds and more particularly to methods for controlling the flow characteristics of powders in fluid beds.

BACKGROUND OF THE INVENTION

Processes are known in the lighting industry for applying a thin protective coating to the outer surface of individual phosphor particles in order to improve the performance properties, e.g., lamp maintenance, of the phosphor when used in lamps.

One such known process applies such coating to the individual phosphor particles employing a fluidized bed which is maintained in a temperature gradient. See U.S. Pat. No. 4,585,673 "Method For Coating Phosphor Particles" of A. G. Sigai, issued Apr. 29, 1986, the disclosure of which is hereby incorporated herein by reference.

Such coating processes can experience operational problems if the phosphor powder becomes too fluid in the bed. Very fluid or mobile phosphor powders transfer heat efficiently from the hot upper zone of the reactor to the lower zone. One possible consequence of such high powder mobility is a loss of the temperature gradient in the system leading to unacceptably high temperatures in the lower section of the reactor. This often may lead to undesired pyrolysis of precursors at the distributor plate causing plugging of the plate and a loss in conversion efficiency. In addition, the high temperatures at the reactor bottom often may lead to failure of gaskets, which is undesirable when using flammable or pyrophoric chemicals.

SUMMARY OF THE INVENTION

This invention overcomes the problems stated above through addition of a fibrous material (also referred to herein as "fiber") to a phosphor to increase the cohesiveness of the phosphor.

In accordance with the present invention, there is provided a method for increasing the cohesiveness of a phosphor fluid bed, the method comprising adding an effective amount of fibrous material to a phosphor so as to increase the Hausner Ratio (HR) of the phosphor.

The phosphor to which the fibrous material is added can be a single phosphor or a mixture, or blend, of more than one phosphor.

The scope of this invention also includes the use of other additives in conjunction with the fibrous material, in the fluidization of phosphors. For example, the phosphor-fibrous material blend may further include a fluidizing aid, such as Degussa's Alon C, Aerosil 200, or Aerosil R 972.

The average length of individual fibers of the fibrous material is preferably five to twelve times the average particle size (diameter) of the phosphor. The volume average diameter, $D_v$, of the phosphor sample may be used as a measure of the average particle size (diameter) of the phosphor. One may obtain $D_v$ from the relationship:

$$D_v = \Sigma v_i d_i$$

where,
$v_i$: volume fraction of phosphor of average particle size, $d_i$.

The diameter of the fiber is preferably such that the aspect ratio of the fiber is between 15 to 25. The aspect ratio is defined as the ratio of the length of fiber to its diameter.

In a preferred embodiment, the fibrous material is a polycrystalline alumina fiber having a mass mean cross-section diameter of 4 microns or less and a mass mean fiber length of at least 60 microns.

In a most preferred embodiment, the fibrous material is Saffil HA (High Alpha) fiber manufactured by ICI Americas Inc.

The fibrous material is blended with the phosphor in a suitable blender to achieve thorough mixing, typically for about 35 minutes. The loading of the fibrous material is generally in the range from about 1 to about 35 weight % of the phosphor.

For a better understanding to the present invention, together with other advantages and capabilities thereof, reference is made to the following disclosure and appended claims in connection with the above-described drawings.

DETAILED DESCRIPTION OF A PREFERRED EMBODIMENT

As described above, it has been found in accordance with this invention that the cohesiveness of a phosphor fluid bed can be increased by addition, to the phosphor, of an effective amount of fibrous material, the effective amount being an amount that increases the Hausner Ratio (HR) of the phosphor.

The average length of the fibers of the fibrous material is preferably five to twelve times the average particle size of the phosphor. The volume average diameter, $D_v$, of the phosphor sample may be used as a measure of the average particle size (diameter) of the phosphor. One may obtain $D_v$ from the relationship:

$$D_v = \Sigma v_i d_i$$

where
$v_i$ is the volume fraction of phosphor of average particle size, $d_i$.

Information on $v_i$ and $d_i$ is easily obtained from standard volume based particle size measuring instruments like the Malvern laser diffraction system or the Coulter counter and other devices.

The average diameter of the fibers of the fibrous material is preferably such that the aspect ratio of the fiber is between 15 to 25. The aspect ratio is defined as the ratio of the length of fiber to its diameter.

Examples of fibrous materials particularly well-suited for use in the present invention include:
a) any fiber with the above physical dimensions and with a white to off white body color (this is necessary to minimize visible absorption in the fluorescent lamp which would reduce brightness) and with a low aqueous solubility in a pH range of 6 to 9 (this is necessary to minimize holdover problems of phosphor suspensions);
b) alumina fibers with a dominant alpha phase;
c) alumina fibers with a dominant gamma phase;
d) silicon nitride and/or silicon oxynitride fibers.

The fibrous material is preferably a lamp compatible material, i.e., a substance that does not adversely affect lamp operation by, for example, reacting with the lamp fill or lamp components. However, if the coating or layer of phosphor including the fibrous material is to be overcoated with another layer of phosphor or reflective or other material in the lamp so as to isolate the fibrous material from whichever lamp component or fill material it may be reactive with, any fibrous material having appropriate physical dimensions can be used.

An example of a preferred fibrous material is a polycrystalline alumina fiber having a mass mean cross-section diameter of 4 microns or less and a mass mean fiber length of at least 60 microns.

Mass mean length, $D_l$, or diameter, $D_d$, can be found quite simply from the following relationships:

$$D_l = \Sigma m_i l_i$$

$$D_d = \Sigma m_i d_i$$

where $m_i$ is the mass fraction of fibers which have a fiber length of $l_i$ or a cross-section diameter of $d_i$. Volume fraction can equally well be substituted for mass fraction in these relationships. (Video image analysis may be used to obtain values of $D_l$ and $D_d$.)

In a most preferred embodiment, the fibrous material is Saffil HA (High Alpha) fiber manufactured by ICI Americas Inc.

The fibrous material is blended with the phosphor in a suitable blender, typically for about 35 minutes. The loading of the fibrous material is generally in the range from about 1 to about 35 weight of the phosphor.

The optimum amount of fibrous material addition can be found by measuring the Loosely Packed Bulk Density (LPBD) and the Tapped Density (TD) of the phosphor, as a function of increasing percentages of the fibrous material, on a Hosokawa Powder Tester. The Hausner Ratio (HR), which is the ratio of TD to LPBD, is plotted versus the percentage of the fibrous material.

The higher the value of HR, the less free flowing is the blend. This is an indication of increasing cohesiveness among the particles. After one obtains the plot of the HR versus the concentration of the fiber, the optimum level of fiber can be found. It is important to realize that there is no one optimum level of fiber addition for all processes. In fact, the attractiveness of this invention is that one can achieve any desired degree of increase in powder cohesiveness by adjusting the fiber concentration.

As an example, if the HR curve shows a local maximum and one desires a maximum increase in cohesiveness, then the optimum level is the % of fiber which yields HR maximum. In most cases, one does *not* seek to increase the cohesiveness of the phosphor by large amounts, but rather by a controlled amount such that the fluid bed reestablishes the desired temperature gradient without losing significant powder mobility. A large loss in powder mobility can have adverse effects on the quality of coating produced in reactors of the type described in U.S. Pat. No. 4,585,673. The optimum fiber level in such processes may be decided by selecting an HR of the blend which is some multiple of the HR of the phosphor. An upper bound for HR (blend) is 1.33 times HR (phosphor): this is sufficient for fluid bed processing of mobile phosphors. The optimum fiber level is equal to or less than that concentration which yields the upper bound for HR (blend) described above.

The particularly preferred fibrous material is a polycrystalline alumina fiber manufactured by ICI Americas Inc. and marketed under the trade name "Saffil HA."

According to the product literature, Saffil HA Alumina fibrous material is manufactured using a solution spinning process followed by progressive heat treatment. ICI reports the use of Saffil fiber in a variety of applications: furnace linings, furnace accessories, expansion joints/gaskets, catalyst supports, filtration, reinforcement for metal matrix/ceramic composites and in protective clothing. No reported use of this family of fibers in fluidization of any kind, including the fluidization of phosphors has been identified heretofore.

Figure 1:
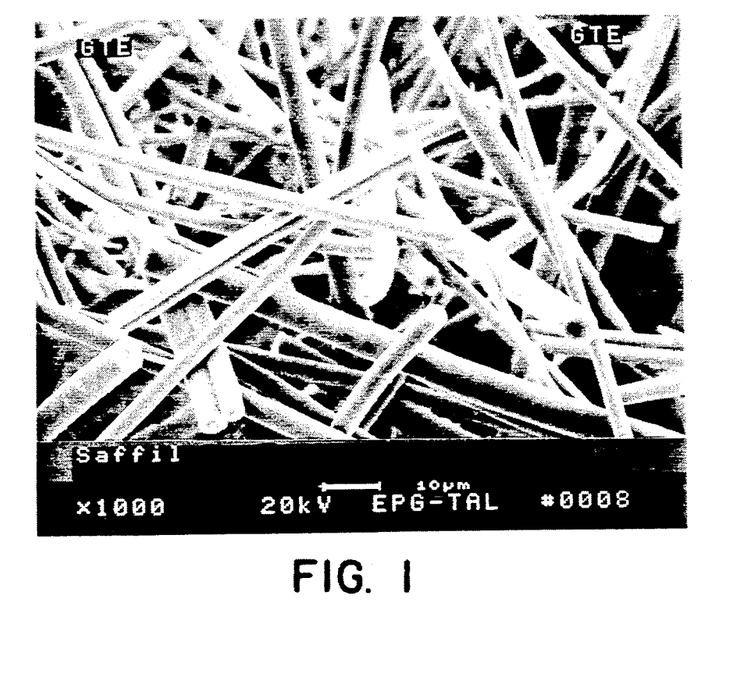
FIG. 1 shows a scanning electron micrograph of Saffil HA fiber manufactured by ICI Americas Inc. (1,000 times magnification).

A scanning electron micrograph of the Saffil HA fiber is shown in FIG. 1. The uniformity in fiber diameter is quite evident: the mass mean diameter is about 3 microns. In addition, the mass mean length of this fiber is about 64 microns. The fiber has a white color, a melting point of 2000° C., and a fiber density of about 3.5 g/cm$^3$.

An evaluation of Saffil HA as an "anti-fluidizing aid" for a phosphor has been conducted using a cohesive phosphor in order to show that the fibrous material increases cohesiveness and does *not* act to improve the fluidization of the cohesive phosphor.

The tests were designed in this manner to show that addition of fibrous material to a cohesive phosphor does not behave in the same manner as the family of Tendrillar (fibrous) Carbonaceous Material (TCM) fluidizing aid found, tested, and reported by E. F. Brooks and T. J. Fitzgerald of the Chemical Technology Operations of TRW Inc. See Brooks, E. F. and T. J. Fitzgerald, *FLUIDIZATION V*, K. Ostergaard and A. Sorensen, Editors, Engineering Foundation (1986), which appears to be the only reported use of fibrous material in fluidization.

The Cohesive Phosphor

Figure 2:
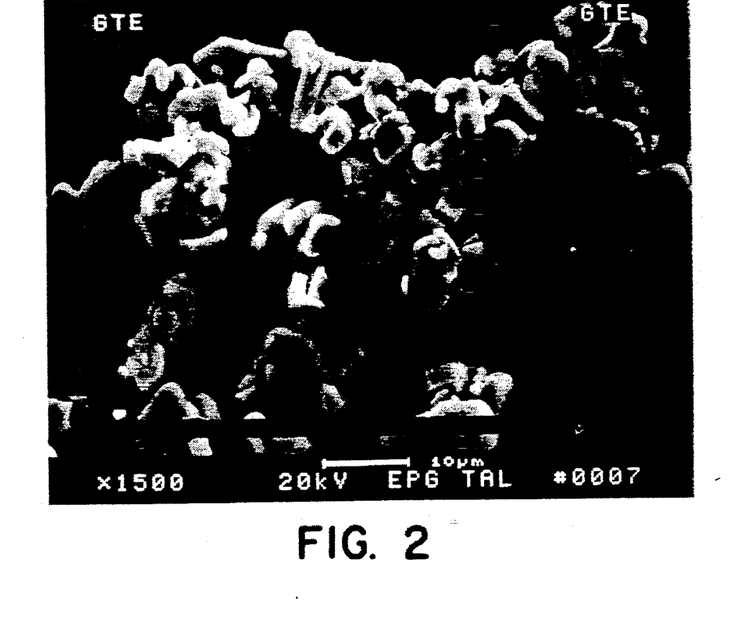
FIG. 2 shows a scanning electron micrograph of GTE phosphor type 2011 (1,500 times magnification).

The cohesive phosphor used herein was GTE phosphor type 2011, a blacklight phosphor. The material symbol for this phosphor is $BaSi_2O_5$:Pb. The phosphor has a material density of 3.9 g/cc. The Hausner Ratio of the powder, measured on a Hosokawa tester, was found to be 1.65. Laser diffraction measurements, conducted on a Malvern Master Sizer, yield a surface and volume average particle size of 4.25 and 11.9 microns, respectively. FIG. 2 is a SEM of the GTE phosphor type 2011.

Blending of the Phosphor and the Fibrous Material

A Patterson-Kelley twin shell pin intensifier blender, model IB-4S, was used to blend the Saffil HA Alumina fibrous material intimately with the cohesive 2011 phosphor. The sequence of blending steps was as follows: 600 seconds (s) with the intensifier bar, 600s without the bar, 300s with it, 300s without it and a final 300s with the intensifier bar activated. The total blending time was 35 minutes. The typical charge in the blender was about 1.5 kg.

In all 15 concentrations of the fibrous material were studied. The values, expressed as a percentage of the total mass of the mixture, are: 0, 0.5, 1, 5, 10, 20, 30, 35, 40, 50, 60, 70, 80, 90, and 100.

Measurements Of Blend Cohesiveness

Measurements of blend cohesiveness were conducted on a Hosokawa Powder Tester. For each phosphor-fibrous material sample of a given concentration, five independent measurements of the loosely packed bulk density (LPBD) and the tapped density (TD) were obtained, leading to five independent estimates for the HR for each sample. The ratio of the TD to LPBD gives the Hausner Ratio, HR. A decrease in the value of the LPBD is an indication of increasing cohesiveness because a lower LPBD reflects more of a structure to the powder caused by increased interparticle forces. In addition, it is well documented that the HR is a good measure of the cohesiveness of a powder. Any treatment which increases the value of HR can be regarded as having increased the cohesiveness of the blend.

The bulk density measurements were followed by fluid bed testing, wherein the effects of the increase in blend cohesiveness on fluid bed performance was investigated. Increased cohesiveness is visually discernible by less powder motion and more gas channeling in the bed.

Fluid Bed Experimental Setup

Figure 3:
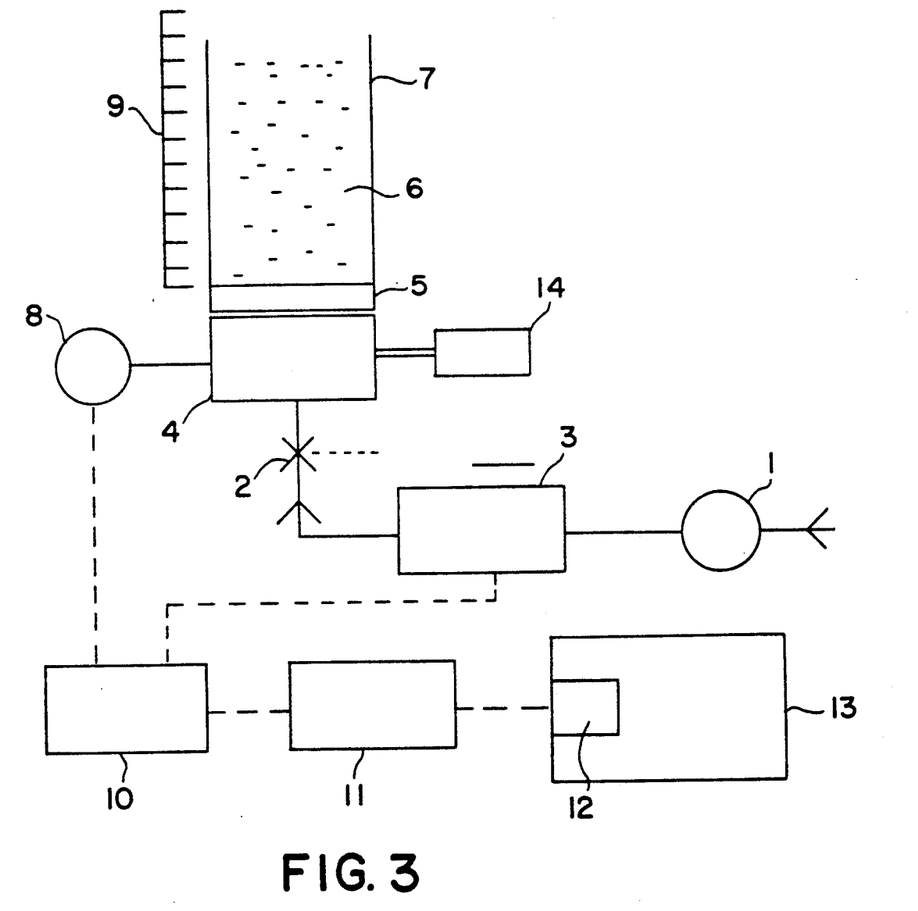
FIG. 3 schematically shows the experimental setup used for the fluid bed testing described in the specification.

FIG. 3 shows the experimental setup used to perform the experimental tests described and reported herein. Fluidizing air was fed through a PFD 301 mass flow controller (MFC) 3 to a 0.1016 meter (m) ID and 0.864 m high glass Pyrex tube which forms the wall of the fluid bed. The MFC 3 has a full scale of 0.833E-3 $m^3$/s (50 slm) with an accuracy of ±1% of span. The set point for the flow was input to a PFD 944 power supply linked to the MFC. The time taken by the MFC for a 10% to 90% change in response to a step in the setpoint is 3s. A 0-5 V output proportional to the air flow rate is available from the PFD 944.

The distributor or distributor plate 5 was a 5 micron porosity and 0.00157 m thick SS 304 disc. Attached to the plenum 4 was a Heise model 620 optical pressure transducer 8, with a range of 0 to 12,291.2 Pa gauge pressure (0 to 50 inches $H_2O$ gauge pressure). The output of this transducer 8 is 0 to 5 V in this pressure range. The accuracy of the instrument is within ±0.15% of span, and the response time is about 2 ms to a step change in pressure. A solenoid valve 2 may rapidly switch on or off the flow of gas to the plenum 4 and the pressure regulator 1 controls the pressure upstream of the MFC 3.

The MFC 3 and pressure transducer 8 were interfaced, using Metrabyte I/O boards, to an IBM 7531 computer 13 for real time data acquisition of gas flow rate and plenum pressure. As illustrated in FIG. 3, screw terminal board, STA08, reference number 10 is connected to expansion multiplexer, EXP16, reference number 11, which in turn is connected to analog to digital board, DAS8, reference number 12. The frequency of data acquisition was 1 Hz. Bed height was measured using a scale 9 attached to the side of the glass wall 7. LabTech Notebook and RS/1 were used as the data acquisition and analysis software, respectively.

The fluidized bed 6 which contains phosphor particles and fiber blends has a top and bottom with the the distributor plate 5 being at the bottom. The bed 6 is confined within the sides of the walls 7 which extend between the top and the bottom.

In each case, the gas flow rate through the distributor 5 was changed in an identical pattern so that results from the three runs could be compared unambiguously. The following control points were used on the MFC: 5, 10, 15, 20, 25, 30, 35, 45, 55, 65, 80 and 100% of maximum flow. Each set point was maintained for 300s after equilibration of flow.

Results of Measurements on Cohesiveness

Figure 4:
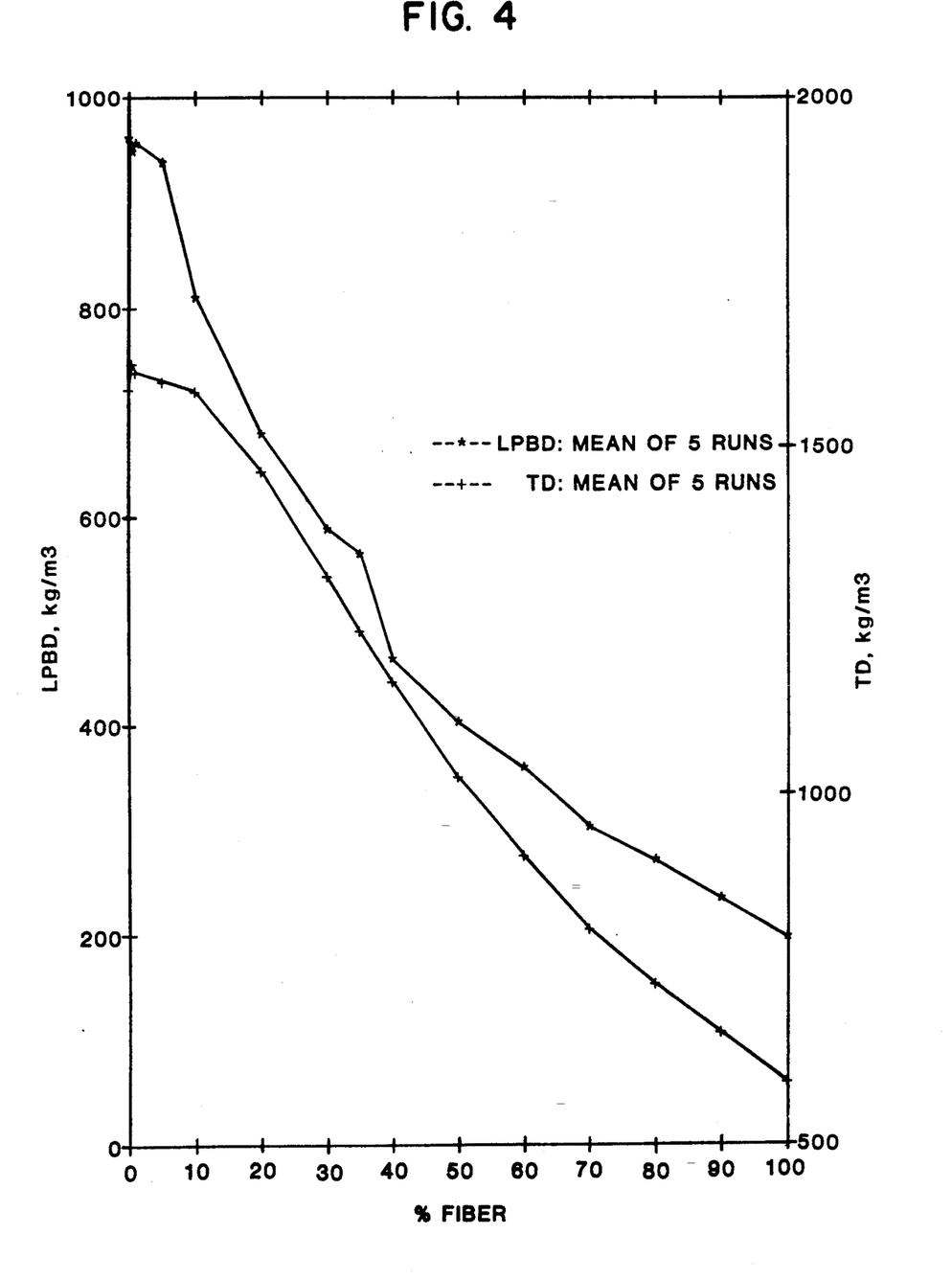
FIG. 4 is a plot of the mean LPBD (five experiments for each fiber concentration) and the mean TD (five experiments for each fiber concentration) as a function of the amount of fibrous material added to the phosphor (in weight %).

The data summarized in Table 1 shows the effect of the addition, to a phosphor, of Saffil HA alumina fibrous material on LPBD. The corresponding plot of the LPBD (mean of the five runs for each fibrous material concentration, in weight %) is displayed in FIG. 4.

TABLE 1

Effect of the Addition of Saffil HA Alumina Fibrous Material on Loosely Packed Bulk Density (LPBD)

| Sample No. | Wt. % Saffil | Run 1 | Run 2 | Run 3 | Run 4 | Run 5 |
|---|---|---|---|---|---|---|
| 1 | 0.0 | 959.0 | 953.9 | 964.7 | 973.6 | 951.0 |
| 2 | 0.5 | 951.8 | 948.7 | 949.5 | 947.4 | 943.0 |
| 3 | 1.0 | 961.7 | 949.9 | 945.1 | 957.0 | 964.1 |
| 4 | 5.0 | 937.2 | 949.6 | 937.9 | 936.0 | 930.1 |
| 5 | 10.0 | 828.6 | 796.6 | 821.8 | 794.4 | 810.5 |
| 6 | 20.0 | 681.9 | 662.0 | 692.5 | 680.5 | 678.9 |
| 7 | 30.0 | 579.4 | 594.9 | 585.6 | 596.8 | 583.2 |
| 8 | 35.0 | 571.1 | 550.3 | 562.5 | 574.2 | 561.5 |
| 9 | 40.0 | 465.4 | 458.8 | 468.0 | 460.0 | 469.1 |
| 10 | 50.0 | 403.2 | 391.1 | 412.1 | 407.6 | 399.3 |
| 11 | 60.0 | 353.1 | 360.8 | 375.0 | 357.1 | 350.0 |
| 12 | 70.0 | 311.5 | 300.1 | 303.0 | 298.7 | 293.8 |
| 13 | 80.0 | 281.5 | 274.9 | 271.1 | 264.5 | 263.0 |
| 14. | 90.0 | 238.0 | 227.9 | 241.7 | 232.5 | 231.9 |
| 15 | 100.0 | 205.6 | 187.6 | 194.9 | 199.3 | 199.9 |

LPBD is expressed in kg/$m^3$

It is evident from the data set forth in Table 1 that the addition of the fibrous material to the phosphor does decrease the LPBD of the blend, which indicates an increase in cohesiveness of the blend.

The Tukey's Post Hoc Test, a statistical test for pairwise comparison between treatments as discussed in Wheeler, UNDERSTANDING INDUSTRIAL EX- PERIMENTATION, Statistical Process Controls Inc., Tennessee, 1988, was conducted on the data presented in Table 1. Confirmatory analysis was used to minimize the occurrence of type I error. The biased pooled variance estimate is recommended as being the correct estimate to use for the standard deviation of the variable. A significance level of 5% was adopted. Any two subgroup averages that differ by more than Tukey's Honestly Significant Difference (HSD) are detectably different at a 5% significance level. It is worth noting that if treatments X and Y are not detectably different, and so are treatments Y and Z, it does not follow automatically follow that X and Z are not detectably different.

Statistical data analysis, using the above-discussed Tukey's Post Hoc Test, concludes that no detectable differences exist between the following concentrations of the fibrous material: 0%, 0.5%, and 1%. The same can be said for the group 0.5%, 1%, and 5%. In addition, the test shows that all samples beyond a 5% Saffil concentration have detectably different mean LPBD values.

The data set forth in Table 2 shows the effect of the addition, to a phosphor, of the fibrous material on TD. The corresponding graph of the mean TD is also presented in FIG. 4.

TABLE 2

Effect of the Addition of Saffil HA Alumina Fibrous Material on Tapped Density (TD)

| Sample No. | Wt. % | Run 1 | Run 2 | Run 3 | Run 4 | Run 5 |
|---|---|---|---|---|---|---|
| 1 | 0.0 | 1583.6 | 1589.1 | 1575.7 | 1587.6 | 1585.5 |
| 2 | 0.5 | 1614.0 | 1614.9 | 1623.0 | 1626.0 | 1621.2 |
| 3 | 1.0 | 1609.8 | 1606.0 | 1609.0 | 1603.4 | 1609.9 |
| 4 | 5.0 | 1595.0 | 1595.8 | 1592.9 | 1593.6 | 1596.8 |
| 5 | 10.0 | 1576.0 | 1578.6 | 1583.1 | 1585.9 | 1580.8 |
| 6 | 20.0 | 1463.2 | 1458.0 | 1466.2 | 1467.5 | 1466.8 |
| 7 | 30.0 | 1314.9 | 1315.9 | 1310.7 | 1321.0 | 1308.8 |
| 8 | 35.0 | 1238.0 | 1230.9 | 1231.6 | 1242.0 | 1247.0 |
| 9 | 40.0 | 1171.1 | 1158.7 | 1157.6 | 1161.8 | 1165.1 |
| 10 | 50.0 | 1033.2 | 1028.6 | 1024.0 | 1025.1 | 1019.7 |
| 11 | 60.0 | 913.7 | 915.6 | 920.1 | 904.0 | 913.5 |
| 12 | 70.0 | 807.3 | 808.7 | 812.8 | 803.1 | 808.9 |
| 13 | 80.0 | 730.0 | 735.5 | 719.9 | 731.8 | 733.8 |
| 14 | 90.0 | 667.8 | 655.7 | 659.5 | 658.5 | 659.1 |
| 15 | 100.0 | 588.4 | 587.4 | 588.7 | 591.6 | 591.2 |

TD is expressed in $kg/m^3$ The decrease in blend TD with addition of the fibrous material is very clear. Statistical analysis indicates that all the 15 treatment levels are detectably different.

Figure 5:
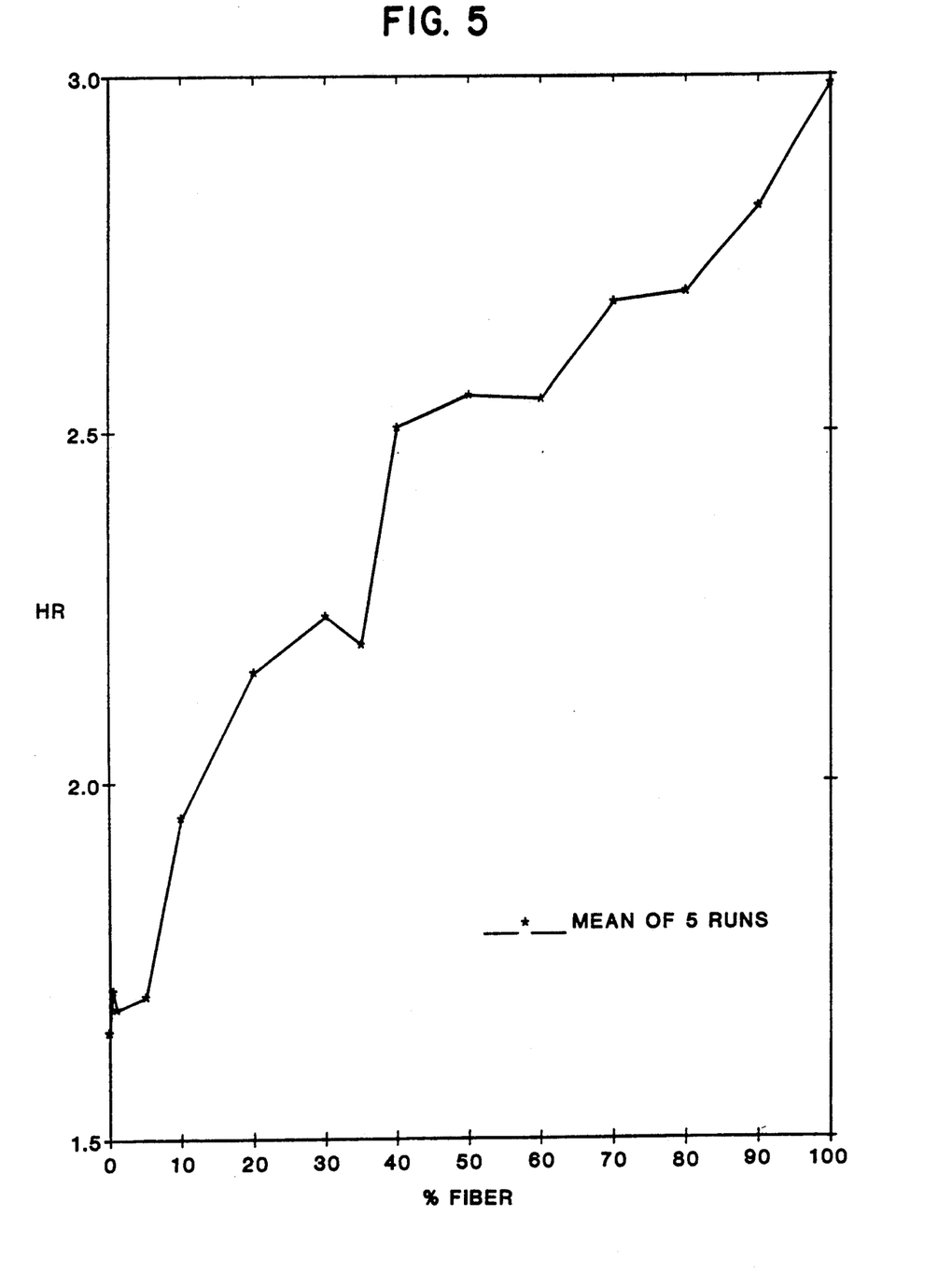
FIG. 5 is a plot of the mean HR (five data points per fiber concentration) as a function of the amount of fibrous material added to the phosphor (in weight %).

The HR values, calculated from the corresponding cells in Tables 1 and 2 are displayed in Table 3. The graphical representation of the HR is available in FIG. 5.

TABLE 3

Effect of the Addition of Saffil HA Alumina Fibrous Material on Hausner Ratio (HR)

| Sample No. | Wt. % Saffil | Run 1 | Run 2 | Run 3 | Run 4 | Run 5 |
|---|---|---|---|---|---|---|
| 1 | 0.0 | 1.6513 | 1.6659 | 1.6334 | 1.6306 | 1.6672 |
| 2 | 0.5 | 1.6957 | 1.7022 | 1.7093 | 1.7163 | 1.7192 |
| 3 | 1.0 | 1.6739 | 1.6907 | 1.7025 | 1.6754 | 1.6698 |
| 4 | 5.0 | 1.7019 | 1.6805 | 1.6984 | 1.7026 | 1.7168 |
| 5 | 10.0 | 1.9020 | 1.9817 | 1.9264 | 1.9961 | 1.9504 |
| 6 | 20.0 | 2.1458 | 2.2024 | 2.1173 | 2.1565 | 2.1606 |
| 7 | 30.0 | 2.2694 | 2.2120 | 2.2382 | 2.2135 | 2.2442 |
| 8 | 35.0 | 2.1677 | 2.2368 | 2.1895 | 2.1630 | 2.2208 |
| 9 | 40.0 | 2.5163 | 2.5255 | 2.4735 | 2.5257 | 2.4837 |

TABLE 3-continued

Effect of the Addition of Saffil HA Alumina Fibrous Material on Hausner Ratio (HR)

| Sample No. | Wt. % Saffil | Run 1 | Run 2 | Run 3 | Run 4 | Run 5 |
|---|---|---|---|---|---|---|
| 10 | 50.0 | 2.5625 | 2.6300 | 2.4848 | 2.5150 | 2.5537 |
| 11 | 60.0 | 2.5877 | 2.5377 | 2.4536 | 2.5315 | 2.6100 |
| 12 | 70.0 | 2.5917 | 2.6948 | 2.6825 | 2.6887 | 2.7532 |
| 13 | 80.0 | 2.5933 | 2.6755 | 2.6555 | 2.7667 | 2.7901 |
| 14 | 90.0 | 2.8059 | 2.8771 | 2.7286 | 2.8323 | 2.8422 |
| 15 | 100.0 | 2.8619 | 3.1311 | 3.0205 | 2.9684 | 2.9575 |

HR is dimensionless

The increase in HR with addition of Saffil HA Alumina fibrous material demonstrates that the cohesiveness of the blend is increased by addition of the fibrous material to the phosphor. Statistical analysis indicates that no detectable difference exists in the HR values for the following group: 0%, 0.5%, 1%, and 5%. It is important to realize that this conclusion of "no detectable difference" is caused by the variation in the individual runs for these four groups as compared to the variation in all the runs for all fifteen groups. It does not follow that the fluid bed performance for these four groups will be the same. In fact, the HR for 1% Saffil HA Alumina fibrous material is higher than that for the control, and it is expected that the fluid bed performance for the former will be slightly inferior to that of the control. The statistical analysis also concludes that the HR is detectably different for all concentrations of the fibrous material exceeding 5% by mass of the blend.

As discussed above, the higher the value of HR, the less free flowing is the blend. This is an indication of increasing cohesiveness among the particles. After one obtains the plot of the HR versus the concentration of the fiber, the optimum level of fiber can be found. It is important to realize that there is no one optimum level of fiber addition for all processes. In fact, the attractiveness of this invention is that one can achieve any desired degree of increase in powder cohesiveness by adjusting the fiber concentration.

As an example, if the HR curve shows a local maximum and one desires a maximum increase in cohesiveness, then the optimum level is the % of fiber which yields the local maximum HR. In most cases, one does *not* seek to increase the cohesiveness of the phosphor by large amounts, but rather by a controlled amount such that the fluid bed reestablishes the desired temperature gradient without losing significant powder mobility. A large loss in powder mobility can have adverse effects on the quality of coating produced in reactors of the type described in U.S. Pat. No. 4,585,673. The optimum fiber level in such processes may be decided by selecting an HR of the blend which is some multiple of the HR of the phosphor. An upper bound for HR (blend) is 1.33 times HR (phosphor): this is sufficient for fluid bed processing of mobile phosphors. The optimum fiber level is equal to or less than that concentration which yields the upper bound for HR (blend) described above.

PREDICTION OF HR OF PHOSPHOR-FIBER BLEND

A model has been developed to estimate the Hr of the phosphor-fiber blend for any intermediate concentration of fiber in the blend. The model needs four experimental inputs: LPBD of the phosphor, LPBD of the fiber, TD of the phosphor and TD of the fiber. The model is useful in that it reduces significantly the number of experiments necessary to generate a fair approximation to the actual HR versus concentration curve.

It is assumed that both the fiber and the phosphor maintain their identities, as regards voidage, in the blend. This means the voidage of the phosphor in any blend is the voidage of the phosphor computed from a measurement of the mean LPBD (or TD as the case may be) of the phosphor alone. A similar statement can be made about the voidage of the fiber in any blend.

The model sets up equations to calculate the LPBD and TD of the blend, as a function of the fiber concentration, and obtains the HR as the quotient of these two densities.

TERMINOLOGY $\epsilon_p$: voidage of the phosphor in the blend
$\epsilon_f$: voidage of the fiber in the blend
$\rho_p$: phosphor particle density, kg/m$^3$
$\rho_f$: fiber material density, kg/m$^3$
$\rho_L$: predicted LPBD of blend, kg/m$^3$
$\rho_T$: predicted TD of blend, kg/m$^3$
HR*: predicted HR of blend
LPBD$_p$: LPBD of phosphor alone, experimental value, kg/m$^3$
LPBD$_f$: LPBD of fiber alone, experimental value, kg/m$^3$
$M_p$: mass of phosphor in the blend, kg
$M_f$: mass of fiber in the blend, kg
P: percentage by mass of fiber in the blend
TD$_p$: TD of phosphor alone, experimental value, kg/m$^3$
TD$_f$: TD of fiber alone, experimental value, kg/m$^3$
$V_p$: volume occupied by phosphor in blend, m$^3$
$V_f$: volume occupied by fiber in blend, m$^3$

THE MODEL

Prediction of $\rho_L$ $$M_p = V_p(1-\epsilon_p)\rho_p \quad (1)$$

$$M_f = V_f(1-\epsilon_f)\rho_f \quad (2)$$

$$P = 100 M_f/(M_p+M_f) \quad (3)$$

$$\rho_L = (M_p+M_f)/(V_p+V_f) \quad (4)$$

It follows that one can replace (1) and (2) by relations (5) and (6), respectively, as follows:

$$M_p = LPBD_p V_p = 960.44 V_p \quad (5)$$

$$M_f = LPBD_f V_f = 197.46 V_f \quad (6)$$

It follows from (3) that, $$M_p/M_f = 100/P - 1 \quad (7)$$

It follows from (4), (5) and (6) that, $$\rho_L = (M_p/M_f+1)/(5064.317E-6+1041.1-89E-6M_p/M_f) \quad (8)$$

Figure 6:
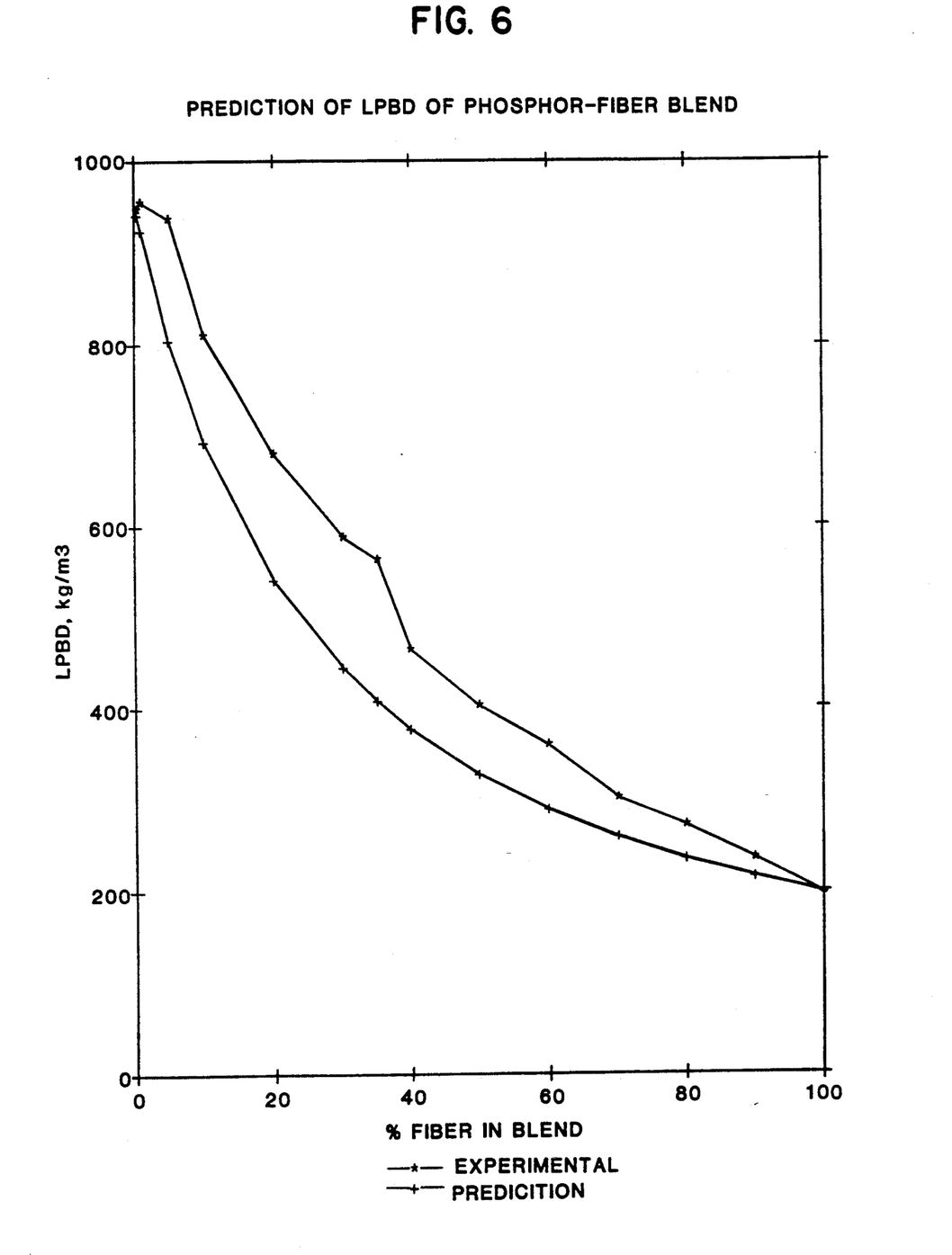
FIG. 6 plots actual and calculated LPBD values as a function of the percentage, by mass, of fibrous material (or fiber) in the phosphor-fibrous material blend.

Using equations (7) and (8), one can easily predict $\rho_L$ as a function of P. This is shown in FIG. 6, which also shows the comparison of the prediction with experimental data on blend LPBD.

Prediction of $\rho_T$

Equations (1) through (4) developed above are valid here too, the difference being the voidages $\epsilon$ refer to the tapped voidages in this section. The following equations can be derived in a manner analogous to those derived in the previous section:

$$M_p = TD_p V_p = 1584.3 V_p \quad (5a)$$

$$M_f = TD_f V_f = 589.46 V_f \quad (6a)$$

Relation (7) derived in the previous section is valid here too. It follows from (4), (5a) and (6a) that, $$\rho_T = (M_p/M_f+1)/(1696.468E-6+631.1-94E-6M_p/M_f) \quad (8a)$$

Figure 7:
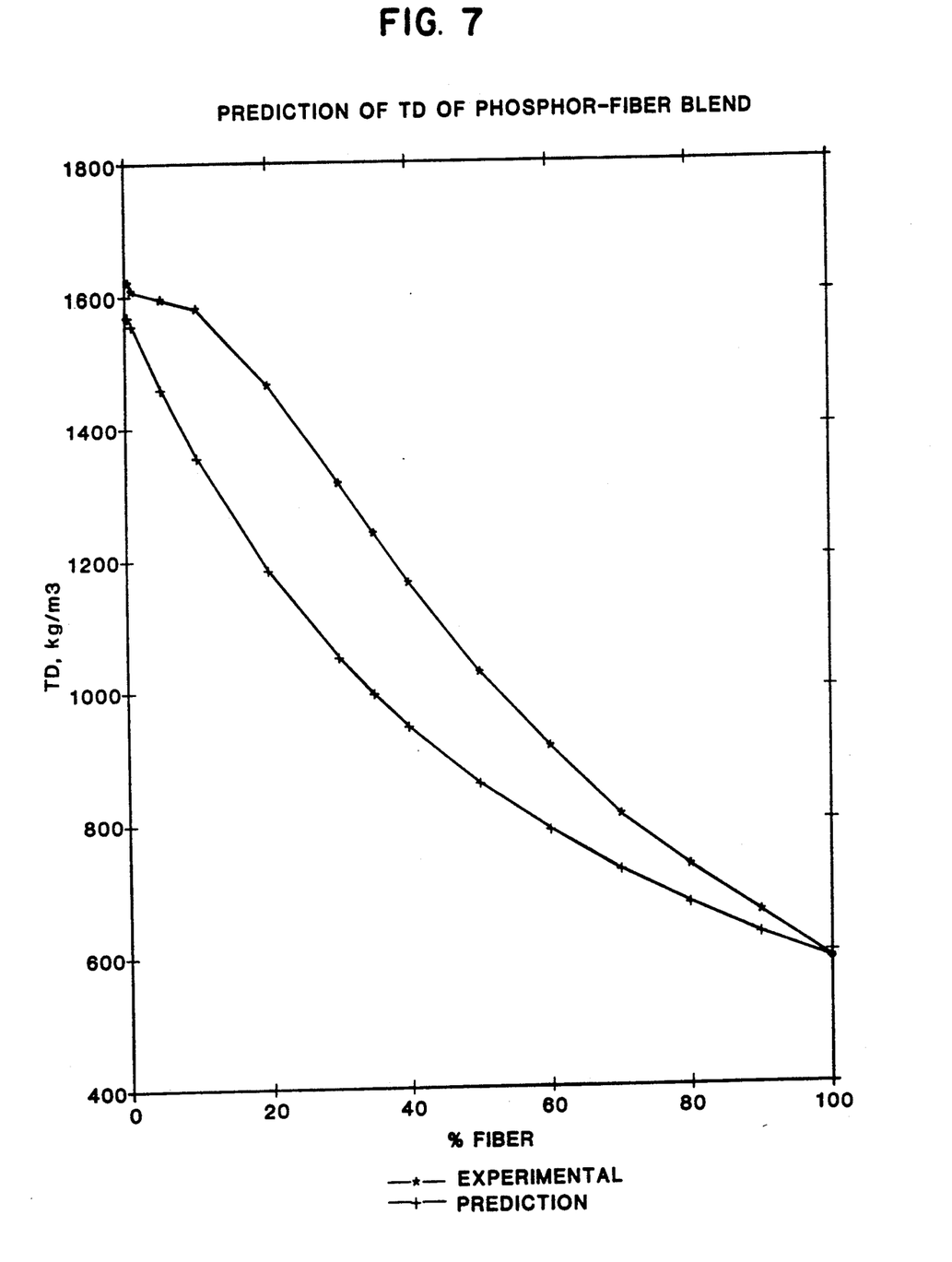
FIG. 7 plots actual and calculated TD values as a function of the percentage, by mass, of fibrous material (or fiber) in the phosphor-fibrous material blend.

It is now possible to predict $\rho_T$ as a function of P. This is shown in FIG. 7 which also shows the comparison with the experimental data on blend TD.

Prediction of HR*

HR* can be easily found by the relation, $$HR^* = \rho_T/\rho_L = \text{Relation (8a)/Relation (8)}$$

It follows that, $$HR^* = (5064.31E-6+1041.91E-6M_p/M_f)/(1696.47E-6+631.19E-6M_p/M_f) \quad (9)$$

Figure 8:
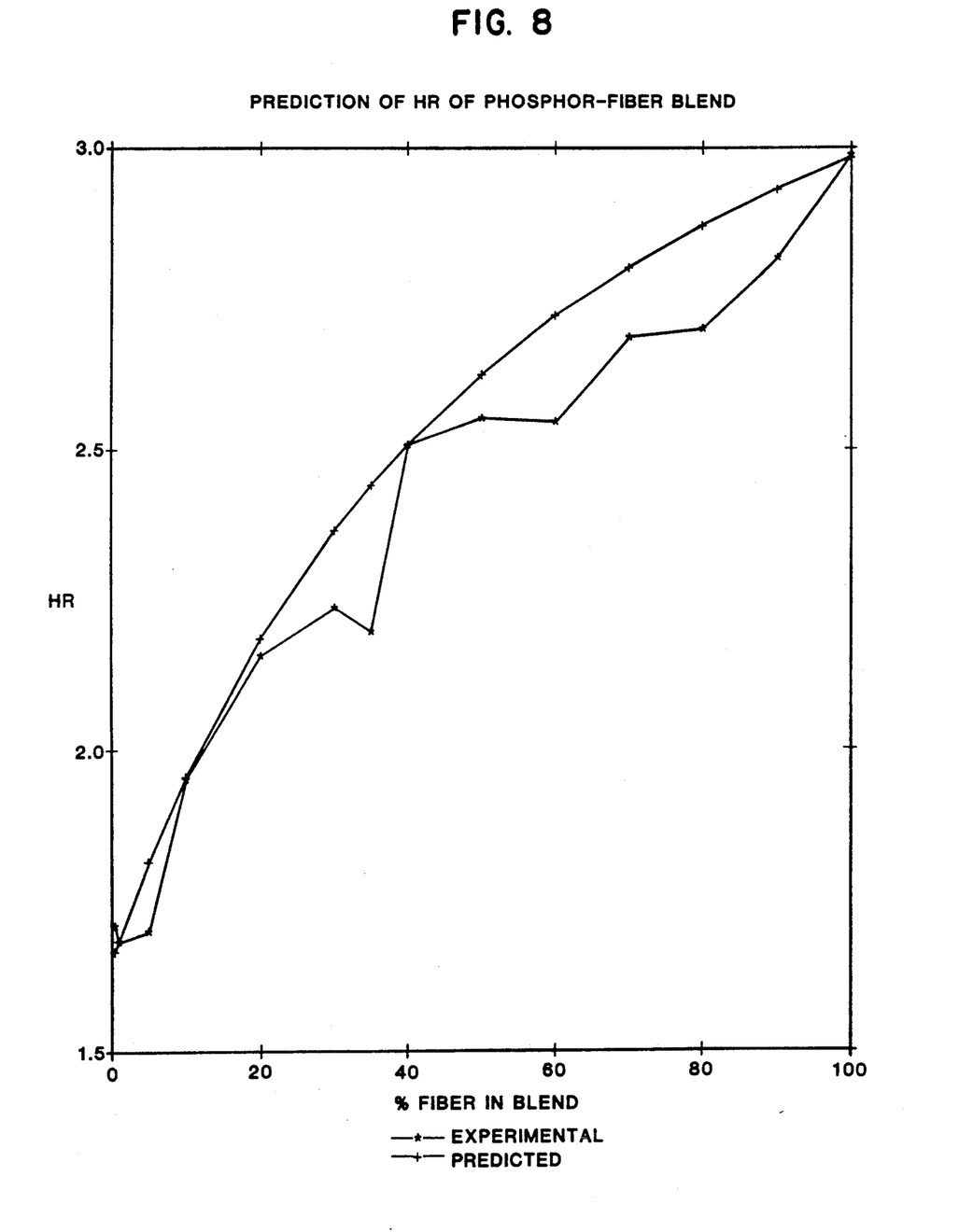
FIG. 8 plots actual and calculated HR values as a function of the percentage, by mass, of fibrous material (or fiber) in the phosphor-fibrous material blend.

A plot of HR* is shown in FIG. 8, together with a comparison with the blend HR obtained from experimental mean values of blend TD and LPBD. The agreement with experiment is very satisfactory. This model can be used to approximate the actual HR-concentration curve to within 10% or less.

Results of Fluid Bed Testing

Distributor Pressure Drop

The distributor pressure drop versus flow rate was found before the addition of any powder to the fluid bed system as used herein and shown in FIG. 3. The statistical best fit line to the data is represented by the equation: 66.26X+132.2 where X is the flow rate in slm. The multiple R$^2$ for this regression is 0.9986, with a standard deviation of 33.71 and an F value of 778,019.

Fluidization of Phosphor Alone (Control Sample)

The fluidization characteristics of the GTE phosphor Type 2011 were studied. A mass of 1.818 kg of the powder was fed to the glass tube. The stagnant height H$_o$, of this powder mass was 250 mm. At 5% of maximum flow, the entire powder mass traveled up the tube for a distance of about 76 mm, and then collapsed downwards. Horizontal and inclined cracks were visible in the phosphor bed. No phosphor movement was detectable. At a gas set point of 10%, small eruptions were seen at the bed surface and light elutriation was observed. The bed height increased to about 267.5 mm. The gas flow rate was progressively increased in the manner outlined previously, each set point being maintained for 300s. At 25% of maximum flow, the eruptions at the bed surface were definitely active. The rate of phosphor loss from the system, due to elutriation, increased with the gas flow rate. The bed expanded with gas flow, the bed expansion at the highest flow rate being 22%. Bed expansion is defined as (Height − Initial Height)/Initial Height. The elutriation loss over the course of the experiment was 70.9 g, which is equivalent to 3.9% of the feed phosphor.

Figure 9:
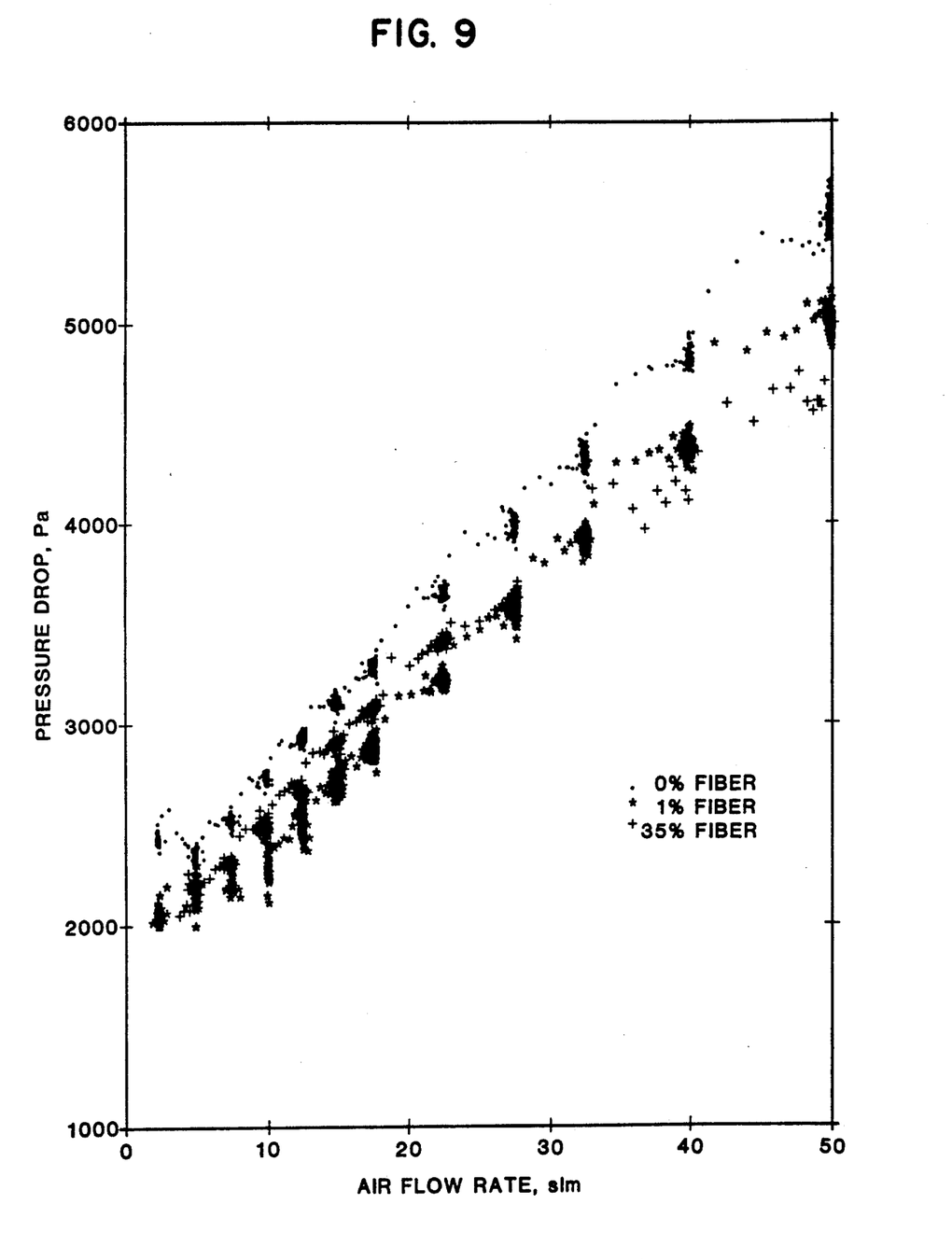
FIG. 9 is a plot of the total pressure drop (in Pascals) of the bed as a function of air flow rate (in slm) for three different phosphor-fibrous material mixture concentrations.

The total pressure drop variation with flow rate is shown in FIG. 9. The statistical best fit line to the data is given by the equation: $68.578X + 2123.21$, with a multiple $R^2$ of 0.9935, standard deviation of regression of 76.245 and an F value of 162,302. The distributor pressure drop is subtracted from the total pressure drop to yield the bed pressure drop. The bed pressure drop, normalized with respect to the initial mass of phosphor in the bed, is about 96% at the highest flow rate.

Fluidization of Phosphor with 1% Fibrous Material

A total charge of 1.472 kg of the blend was fed to the fluid bed system. At 5% of maximum flow, no noticeable change was evident. The bed top was irregular. At 10% flow, a very slight motion was observed at the bed top together with the initiation of very light elutriation. At 15% flow, the tube filled with a dust cloud blocking observation of the bed from the top of the glass tube. Occasional bubbles of gas were observed. At 20% flow, local fluidization was observed in certain sections along the wall with powder motion down towards the plate. The increase in elutriation was most evident each time the setting on the MFC was increased. As the gas flow increased, the bed activity level went up. A few cracks along the walls were seen only when occasional bubbles appeared. The cracks healed to yield a smooth wall after passage of the bubbles. The bed expansion at the highest flow was 26.3%, compared to 22% for the control. The expansion at lower flows could not be measured because the view of the bed top was blocked.

The mobility of powder in the bed was slightly inferior to that in the control: an example is the lower degree of activity at the bed top. The mass of the bed at the end of the run was 1.39 kg which amounts to an elutriation loss of 5.57% (compared to 3.9% for the control) of the initial mass of powder in the system. It is noted that in fluidization experiments conducted on the fibrous material alone, elutriation at 100% of flow was negligible. This means that the increased elutriation loss cannot be attributed to preferential loss of the alumina fibrous material at these flows.

The total pressure drop versus flow rate behavior is shown in FIG. 9. The statistical best fit line is given by the equation: $65.195X + 1764.28$ with a multiple $R^2$ of 0.9925, standard deviation of regression of 77.4 and an F value of 119,332. The normalized bed pressure drop, found in a manner analogous to that described for the control, at the highest flow is about 89.5% (compared to 96% for the control).

In summary, fluidization of the 1% fibrous material sample results in a higher elutriation loss, a lower bed pressure drop, and a slightly higher bed expansion than the control. At this addition level, the behavior of the fibrous material displays a slightly more cohesive nature than the control.

Fluidization of Phosphor with 35% Fibrous Material

A total charge of 1.365 kg of the blend was fed to the fluid system. At 5% of flow, the entire powder mass traveled up the tube for a distance of about 110 mm (compared to about 76 mm for the control), leaving a corresponding void at the top of the distributor plate. This increases slugging tendency is a manifestation of the increased cohesiveness of the blend as compared to the control. The mass stayed suspended for the full 300s until the flow was raised to 10% of maximum. At this point, the powder mass rose again in its entirety for an additional 12.5 mm. At 15% of flow, the elevated slug of powder collapsed to the bottom of the tube and formed a bed with a multitude of horizontal and inclined cracks. As the flow was increased, the cracks enlarged slightly. Motion of powder in the bed was very slight. At 45% of flow, the first visual indication of elutriation was displayed but only for a very short while. Beyond this flow, small amounts of elutriation could be seen only during the period taken for the change in MFC setting to stabilize. When the flow stabilized, the bed returned to a very quiescent form. Large cracks could be seen along the walls of the bed. At 65% of flow, there was some motion of the powder in the bed, but that soon stopped with the formation of three blow holes on the bed top. The holes went down several centimeters into the bed and connected with channels along the bed walls. At 80% of flow, one half of the bed was totally stagnant, while a little motion was observed on the other half. Then that stopped too, with the formation of a large blow hole at the top of the bed. The size of this hole was about 4 cm in diameter, almost 40% of the ID of the tube. The behavior of the system at 100% of flow was equally bad; an initial increase in bed activity was quickly cut off by the formation of a huge 5 cm blow hole at the bed top, extending deep into the bed.

The fluidity of this 35% fibrous material blend was clearly inferior to the control. The blend was definitely much more cohesive than the control. Motion of the bed was very poor and could not be sustained for more than 30s, even at the highest flows. The top of the bed was very nonuniform over the entire course of the run, in contrast to the fairly uniform top for the control run. Bed expansion values are not meaningful in this case since the expansion was mostly due to cracks. The same holds true for the elutriation loss in this case: a lower value than the control results from the absence of any significant bed motion at the 35% fibrous material concentration.

In summary, the fluid bed testing corroborates the earlier finding via the HR testing; that addition of fibrous material to the phosphor increases the cohesiveness of the blend.

Although the foregoing tests were performed with GTE phosphor Type 2011, the method of the invention is useful with any phosphor or phosphor mixture.

While there has been shown and described what at present is considered to be a preferred embodiment of the invention, it will be apparent to those skilled in the art that various changes and modifications may be made therein without departing from the scope of the invention as defined by the appended claims.

What is claimed is:

1. A method of fluidization in a bed of particles having a top portion and a bottom portion and being confined within a container having a side wall comprising:

distributing upwardly flowing gases into said bottom portion for fluidizing the particles;

said bed of particles comprising phosphor particles and inorganic fibers, said inorganic fibers comprising an oxide or nitride of aluminum or silicon, said fibers being present in an effective amount for increasing the Hausner Ratio of said phosphor by a factor greater than 1 and less than or equal to 1.33.

2. A method according to claim 1 having vertical walls wherein said walls have a temperature different that a portion of said particles whereby a temperature gradient is present between said portion of said particles and said walls, said fibers being present in an effective amount for controlling said temperature gradient between said walls and said particles.

3. A method according to claim 2 wherein said fibers have an aspect ratio of from about 15 to about 25.

4. A method according to claim 3 wherein said fibers have an average length of about 5 to about 12 times the average size of said phosphor particles.

5. A method according to claim 4 wherein said fibers comprise polycrystalline alumina fiber.

6. A method according to claim 4 wherein said fibers comprise a silicon oxynitride and are present in an amount of less than about 5 percent by weight of said bed.

* * * * *